United States Patent [19]
Buck et al.

[11] Patent Number: 4,879,601
[45] Date of Patent: Nov. 7, 1989

[54] SYSTEM AND METHOD OF PROVIDING IMAGES FROM SOLID STATE SENSOR

[75] Inventors: Arnold L. Buck, Watertown; Allan C. Green, Framingham, both of Mass.

[73] Assignee: Polaroid Corporation, Cambridge, Mass.

[21] Appl. No.: 271,006

[22] Filed: Nov. 14, 1988

[51] Int. Cl.$^4$ .............................................. H04N 3/14
[52] U.S. Cl. ......................... 358/213.22; 358/213.23; 358/213.29
[58] Field of Search ...................... 358/213.26, 213.22, 358/909, 213.29, 212, 213.23

[56] References Cited

U.S. PATENT DOCUMENTS

| | | | |
|---|---|---|---|
| 4,280,141 | 7/1981 | McCann et al. ..................... | 358/213 |
| 4,677,496 | 6/1987 | Miyazawa ............................ | 358/285 |
| 4,737,841 | 4/1988 | Kinoshita et al. ............... | 358/213.26 |
| 4,758,895 | 7/1988 | Elabd .............................. | 358/213.26 |
| 4,799,109 | 1/1989 | Esser et al. ..................... | 358/213.22 |
| 4,811,105 | 3/1989 | Kinoshita et al. ............... | 358/213.26 |
| 4,816,916 | 3/1989 | Akiyama ......................... | 358/213.29 |

FOREIGN PATENT DOCUMENTS

1405699  9/1975  United Kingdom.

Primary Examiner—Jin F. Ng
Assistant Examiner—Stephen Brinich
Attorney, Agent, or Firm—Edward S. Roman

[57] ABSTRACT

An improved system for transferring still image defining high resolution data from a solid state sensor in an electronic imaging camera in a manner whereby the image data is decimated by a select factor and the rate of transfer decreased to accommodate the recording of high resolution still images by a conventional video storage system.

6 Claims, 5 Drawing Sheets

HORIZONTAL AND VERTICAL DRIVE

SYSTEM AND METHOD OF PROVIDING IMAGES FROM SOLID STATE SENSOR

BACKGROUND OF THE INVENTION

1. Field of the Invention

This invention relates to an improved charge transfer sequencing system for a solid state imaging device and, more particularly, to an improved system of transferring still image defining data from a solid state sensor in an electronic imaging camera.

2. Background of the Invention

High resolution solid state image sensors such as charge coupled devices (CCD), charge injection device detectors (CID) and so forth are finding increasing use as imaging elements for electronic cameras. Such high resolution image sensors produce a large number of pixels for each horizontal line scan of their output. The light sensing arrays may comprise over 1000 discrete light sensing areas or pixels arranged in as many as 500 lines or rows. Recently, electronic imaging cameras of the type that can be operated in either a moving picture mode of operation or a still picture mode of operation have been proposed. Such cameras require a high resolution image sensor which when operated in the still image mode provide the requisite resolution to achieve a quality still image. The clocking or transfer of image data from the light sensing device presents different problems depending upon the mode of operation selected for use of the camera. For example, in the moving picture video mode of operation, conventional field and frame transfer rates of 1/60th and 1/30th of a second, respectively, must be maintained and the image data must be transferred at times compatible with these rates. However, to achieve a high quality moving video image it is not necessary that all the image data sensed by the high resolution array be ultimately transferred from the array. By contrast, however, in order to provide a high quality still image it is necessary that substantially all of the image data be transferred from the light sensing array albeit not necessarily at rates compatible with the standard field and frame rates.

Therefore, it is a primary object of this invention to provide an improved means for transferring still image data from a light sensing array in an electronic image camera in a manner whereby the still image data for each succeeding line of pixels is transferred at rates substantially less than standard video field and frame rates while being simultaneously dessimated.

Other objects of the invention will be in part obvious and will in part appear hereinafter. The invention accordingly comprises a circuit and system possessing the construction, combination of elements and arrangement of parts which are exemplified in the following detailed disclosure.

SUMMARY OF THE INVENTION

The invention relates to an improvement in a system for transferring still image defining electronic information signals from a solid state image sensor. The image sensor is the type that comprises a two-dimensional light sensing array including a plurality of photoresponsive pixel elements arranged in columns and rows. Each of the photoresponsive pixel elements responds to incident image defining light to provide a corresponding electronic information signal. The solid state image sensor further includes a two-dimensional memory having a plurality of electronic information signal storage elements also arranged in columns and rows. Means are provided for transferring the electronic information signals from the photoresponsive pixel elements to the storage elements in a manner whereby the electronic information signals from the rows of the photoresponsive pixel elements are transferred to the columns of the storage elements. Register means are also provided for transferring the electronic information signals from the memory in a select order whereby at least two of the electronic information signals from different columns of photoresponsive elements in the light sensing array can be simultaneously transferred out of the image sensor. The improvement includes a timing control means for transferring the still image defining electronic information signals from the memory array by way of a single register in a manner whereby the electronic information signals from the pixels of each succeeding row of pixels of the light sensing array are transferred in ordered groupings of pixels in which the pixels of each group are interspersed with the pixels of the remaining groups.

DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment when read in conjunction with the accompanying drawings wherein:

DESCRIPTION OF THE PREFERRED EMBODIMENT

Figure 1:
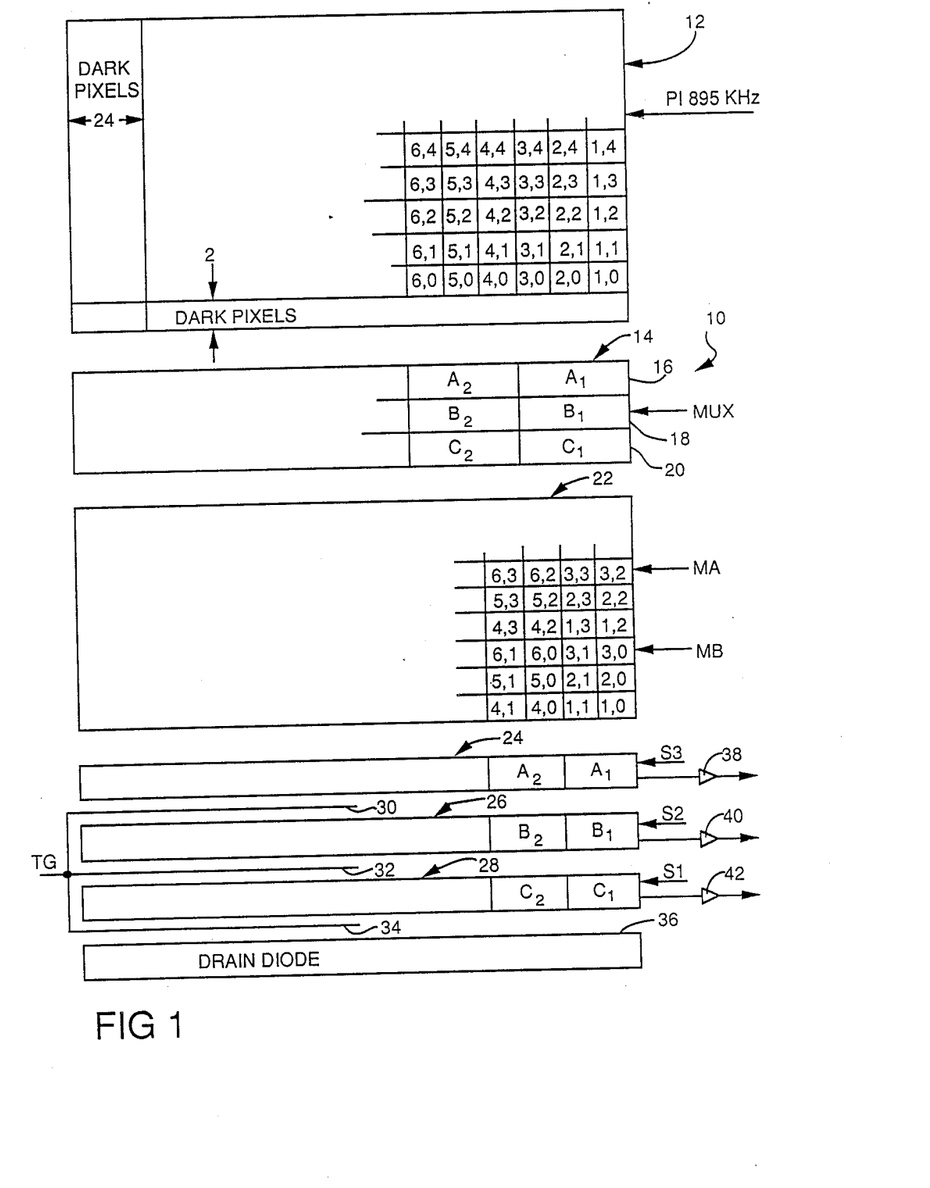
FIG. 1 is an exploded schematic diagram of an image sensing device to which the improved image data transfer system of this invention is applicable.

Referring to FIG. 1 there is shown an exploded view for a CCD array 10 which can be utilized in an electronic imaging camera of the type preferably capable of being operated in either a moving or still picture mode of operation. The CCD array 10 comprises a high resolution two-dimensional image sensing array 12 comprising a plurality of discrete image sensing elements or pixels. In the preferred embodiment the image sensing array 12 comprises 1158 vertical columns and 488 horizontal lines of image sensing pixel elements of which only a small portion are shown in FIG. 1. Each vertical column of 488 image sensing pixel elements comprises 486 active pixels and 2 dark pixels. Each horizontal line of 1158 image sensing elements comprises 1134 active pixels and 24 dark pixels.

As is readily understood, the light sensing array 12 is stationed within an electronic imaging camera housing (not shown) to receive image defining scene light by way of a camera objective lens (not shown). The incident image defining scene light rays are inverted by the objective lens so that the first electronic information signal is output from the pixel as shown at 1,0 shown in the lower right hand corner of the light sensing array 12. As is readily apparent this results in the electronic information signals output from the first two lines or rows of the image sensing array 12 to consist of information derived from dark pixels. In addition, electronic information signals transferred from the last 24 pixels of each line of horizontal pixels also comprises signals derived from dark pixels. As should also be readily understood, only a portion of the active pixel elements are shown wherein the first number in each pixel designates the column in which the pixel resides relative to the first pixel 1,0 and the second number in each pixel designates the line or row in which the pixel resides relative to the first pixel 1,0. The image sensing array 12 may be operated in an interlace mode wherein all the even numbered rows of pixels comprise even interlace fields and all the odd numbered rows comprise odd interlace fields.

Immediately below the CCD array 12 there is provided a multiplexer shown generally at 14 comprising three segmented shift registers 16, 18 and 20. Each of the shift registers 16, 18 and 20 preferably comprises 86 discrete electronic information transfer areas of which only a portion are shown at $A_1$–$C_2$. The multiplexer 14 provides the function of a three bit computation as will be more fully explained in the following discussion.

Immediately below the multiplexer 14 there is provided a two-dimensional memory array comprising a plurality of discrete electronic information storage areas of which only a portion are shown. In a preferred embodiment the memory array 22 comprises 732 discrete horizontal rows of electronic information storage areas arranged in 772 vertical columns. As will be readily understood, each discrete storage area of the memory array 22 is designated by the number corresponding to the image sensing array 12 so that the transfer of electronic information signals from the light sensing array 12 to the memory array 22 by way of the multiplexer 14 may be tracked.

Immediately below the two-dimensional memory array 22 there are provided three linear shift registers 24, 26 and 28 each comprising a row of 386 discrete electronic information transfer areas as shown at $A_1$ through $C_2$. The transfer of electronic information signals between the shift registers 24, 26 and 28 is controlled in the manner of this invention to be subsequently described by way of three transfer gates 30, 32 and 34. A diode drain as shown at 36 is also provided to dump unwanted electronic information signals. The electronic information signals are output from the linear shift registers 24, 26 and 28 by way of output amplifiers 38, 40 and 42, respectively.

Figure 5:
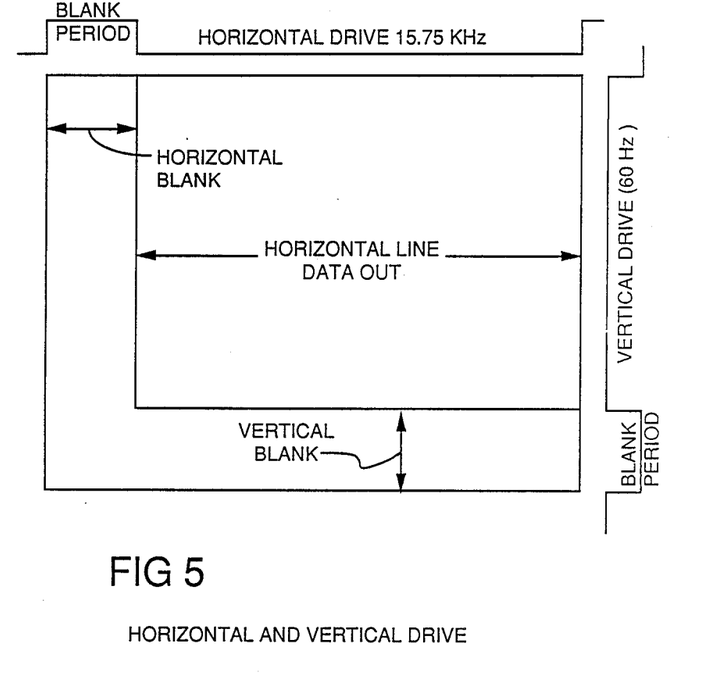

The CCD array 10 may be constructed on a single semiconductor substrate in a well-known manner and is preferably of the frame transfer type. The CCD array 10 preferably operates in the standard RS 170 mode of 60 fields (30 frames) per second. Toward that end there are provided a vertical drive pulse (VD) and a horizontal drive pulse (HD) as shown graphically in FIG. 5. Preferably, the image sensing array 10 is exposed to incident image defining scene light only when the vertical drive pulse is in its non-blank state and such exposure does not occur when the vertical drive pulse is in its blank state. During exposure, the discrete image sensing pixel elements of the image sensing array 12 accumulate electrical charge packets in response to incident image defining scene light and thus in this manner provide an electronic information signal corresponding to the intensity of scene light incident thereto. The duration of each exposure may be controlled by a shutter as is well known in the art.

After exposure, electronic information signals corresponding to each pixel element of the two dimensional image sensing array 12 are transferred to the memory array 22 by way of the multiplexer 14 in the following manner. Referring now to FIGS. 2A–2G in conjunction with FIG. 1 there is shown the sequence by which electronic information signals are transferred from the image sensing array 12 to the memory array 22. Referring specifically to the clocking transfer pulses of FIG. 2A there is shown a photointegration (PI) clock pulse train which is applied to the image sensing array 12. The PI clock pulse train is preferably 895 kilohertz. Each pulse of the PI clock train operates to shift one horizontal row or line of electronic information signals from the light sensing array 12 to the multiplexer 14. Thus, referring to FIG. 2A in conjunction with FIG. 2B it can be seen that at time $T_1$ following the first PI clock pulse, the entire first row of electronic information signals, a portion of which are shown at 1,0 through 6,0, are shifted broadside and rearranged into the three segmented registers 16, 18 and 20 as shown in FIG. 2B. Also, as is readily apparent each succeeding row of electronic image information signals in the sensing array 12 is shifted downwardly as shown. As is now readily apparent, the period of the PI clock pulse is 1.12 microseconds thereby providing for a total transfer time of 545 microseconds. Thus, each frame of electronic information signals for each exposure can be shifted out of the image sensing array 12 in 545 microseconds during the vertical blanking interval. This transfer time is only approximately 3.3 percent of the total exposure time at the standard 1/60th of a second video field rate.

As is also readily apparent from FIG. 2B it can be seen that the electronic information signals shown at 1,0, 2,0 and 3,0 from the first three pixels of the first row of the image sensing array 12 are lined vertically in the first column of transfer areas of the segmented registers 20, 18 and 16, respectively. In like manner, the electronic information signals 4,0, 5,0 and 6,0 from the next three succeeding pixels of the first row of the image sensing array 12 are lined vertically in the second column of transfer areas of the segmented shift registers 20, 18 and 16, respectively. Thus, in this manner the electronic information signals from each three succeeding pixels of a row of the image sensing array 12 are arranged to be aligned in vertical columns.

Transfer of the electronic information signals from the multiplexer 14 to the memory 22 then proceeds in the following manner. A multiplexer clocking signal (MUX) is supplied to the multiplexer 14 to advance the electronic information signals vertically downward and out of the multiplexer as shown in FIGS. 2C $\propto$ 2G. The multiplexer clocking signal (MUX) operates in conjunction with even and odd field clocking signals (MA) and (MB) which are applied to the memory array 14.

Figure 2A:
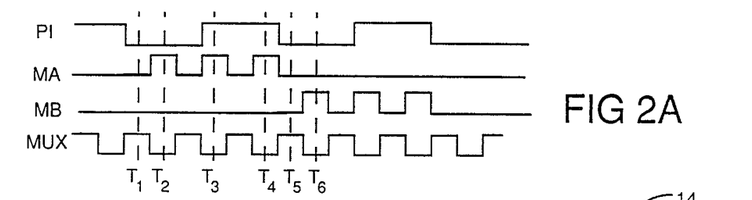
FIG. 2A is a timing diagram showing the clock pulse trains for controlling the transfer of image data between various parts of the, sensing device of FIG. 1.
Figure 2B:
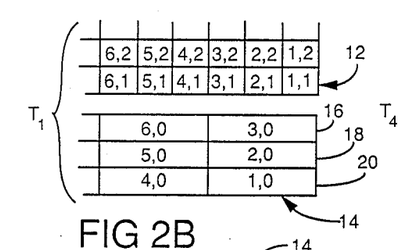
FIGS. 2B through 2G show various stages of image data transfer within the sensing device of FIG. 1 at various times as correlated to FIG. 2A.
Figure 2C:
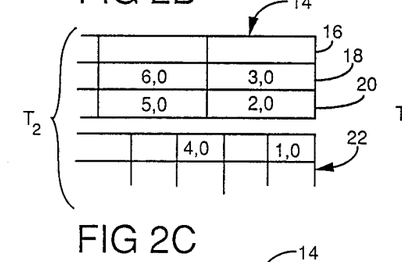

Referring now FIG. 2A in conjunction with FIG. 2C it can be seen that at time $T_2$ there are simultaneously applied the MUX clocking signal and the even field clocking signal MA to advance the electronic information signals in the shift register 20 downwardly into alternate columns of the first row of the memory array 22 as typified by the electronic information signals shown at 1,0 and 4,0. As is readily apparent, the electronic information signals of the shift register 18 are shifted downwardly to the shift register 20 as typified by the electronic information signals as shown at 2,0 and 5,0. In like manner the electronic information signals from the shift register 16 are also simultaneously shifted downwardly to the shift register 18 as typified by the electronic information signals shown at 3,0 and 6,0.

Figure 2D:
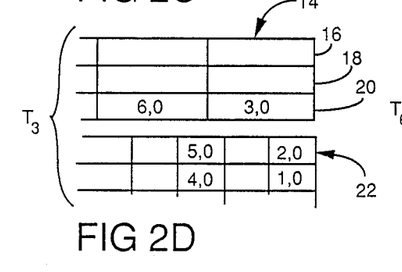

Referring now to FIG. 2A in conjunction with FIG. 2D, it can be seen that at time $T_3$ at the next succeeding even field clock pulse MA and MUX pulse there is provided one further shift downward in the electronic information signals such that the electronic information signals of the first row of the memory array 22 as shown at 1,0 and 4,0 are advanced downwardly to the second row. At the same time the electronic information signals of the shift register 20 are shifted downwardly to the first row of the memory array 22 as shown at 2,0 and 5,0 while the electronic information signals from the shift register 18 are shifted downwardly to the shift register 20 as shown at 3,0 and 6,0.

Figure 2E:
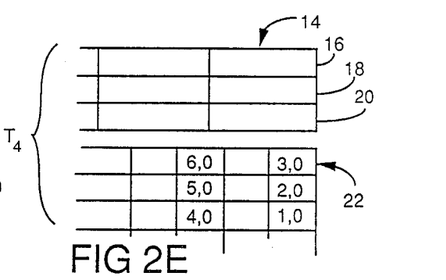

Referring now to FIG. 2A in conjunction with FIG. 2E there is shown the shift downwardly in the electronic information signals that occurs at time $T_4$. Thus as is readily apparent at time $T_4$ the last of the electronic information signals is shifted downwardly out of the multiplexer 14 and into the first row of the memory array 22. The electronic information signals previously shifted to the memory array 22 are shifted downwardly by one discrete storing area as shown.

Figure 2F:
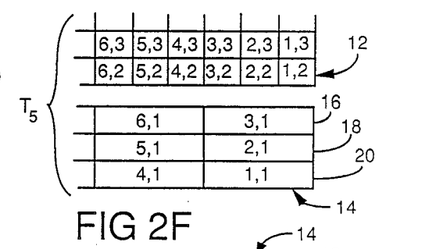
Figure 2G:
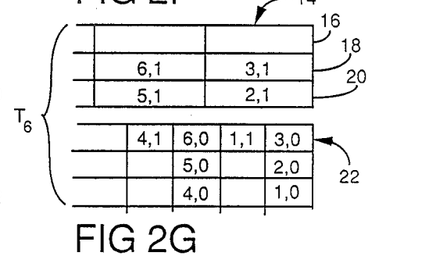

Referring to FIG. 2F in conjunction with FIG. 2A there is shown the loading of the electronic information signals from the next succeeding row of the image sensing array 12 to the multiplexer 14 which occurs at time $T_5$ after the second succeeding PI pulse as shown in FIG. 2A. As previously discussed, all the electronic information signals from the second row of the sensing array 12 are loaded simultaneously from the sensing array 12 to the multiplexer 14 and arranged in columns corresponding to every three pixels. The occurrence of the first odd field pulse MB shown in FIG. 2A at time $T_6$ operates to affect the shift downward in electronic information signals as shown in FIG. 2G.

Thus, in this manner the process continues until all the electronic information signals in the remaining registers 18 and 20 are shifted downward and loaded into the alternate columns of the memory array 22. As now becomes readily apparent, the memory array 22 is loaded in alternate columns corresponding, respectively, to even and odd fields. Since each row of the memory array 22 receives one third of the electronic information signals from two adjacent rows, it can be seen that two thirds times the 1158 pixels of each row of the image sensing array 12 equals the 772 pixels in each row of the memory array 22. Also, since each column of the memory array 22 receives three pixels from every other row of the image sensing array 12, it can be seen that three times the 488 rows of the image sensing array 12 divided by 2 equals the 732 rows of the image storing array 22. As previously discussed, the aforementioned transfer takes place entirely within the period of the vertical blanking interval and this occurs regardless of whether the electronic imaging camera is operated in its moving or still image picture mode of operation.

Figure 3A:
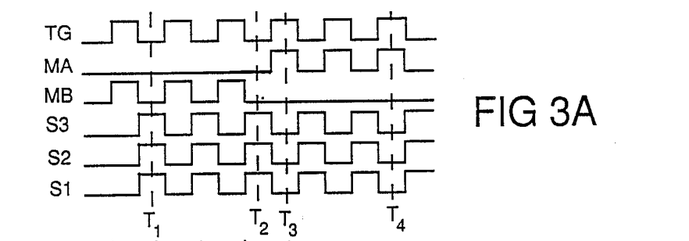
FIG. 3A shows various clock pulse trains for controlling the transfer of image data between other parts of the light sensing device of FIG. 1.

Referring now to FIG. 3A there are shown the timing and clock pulse trains by which electronic information signals are transferred from the memory array 22 by way of the linear shift registers 24, 26 and 28 to external signal processing and storage systems (not shown) in the electronic imaging camera when it is operated in the moving picture mode of operation. As will be well understood, the signal processing and storage aspects of the electronic imaging camera may be of the type as disclosed in U.S. patent application Ser. No. 074,773, entitled "Apparatus for Encoding and Decoding High Resolution Still Images and Video Images for Recording on a Standard Storage Media", by A. C. Green et al., filed July 16, 1987 and do not form a part of the current invention.

Figure 3B:
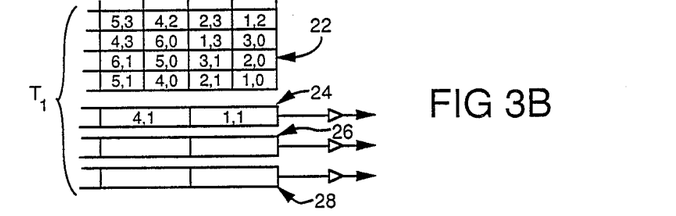
FIGS. 3B through 3E show various stages of image data transfer within the sensing device of FIG. 1 at various times as correlated to FIG. 3A.
Figure 3C:
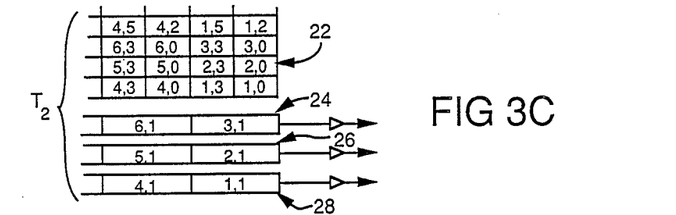

During the moving picture mode of operation the transfer of electronic information signals as described in conjunction with FIGS. 3A-3C occurs during every horizontal line blanking interval. The transfer of electronic information signals vertically between the shift registers 24, 26 and 28 is controlled by the timing clock pulses S3, S2, and S1 in conjunction with the transfer gate timing clock pulse train TG. The even and odd field transfer clock pulse trains MA and MB are also shown in FIG. 3A. Thus, at time $T_1$ it can be seen from FIG. 3B that the electronic information signals from the first odd field line are transferred downwardly from the memory 22 to the first shift register 24 as shown at 1,1 and 4,1. The continued clocking of the odd field clock pulse train MB results finally in the loading of the first odd field row of electronic information signals vertically in the registers 24, 26 and 28 as shown at time $T_2$ in FIG. 3C.

As will be readily understood the synchronization between the transfer gate (TG) clock pulse train and the transfer of clock pulse trains S3, S2 and S1 of the registers 24, 26 and 28 respectively operate in conjunction with the odd field clock pulse train MB to shift the electronic information signals vertically downward between adjacent shift registers instead of linearly outward from the shift registers as occurs when the transfer gate (TG) clock pulse train is turned off. In this manner the registers 24, 26 and 28 are each loaded with one third of the electronic information signals of the first odd field row from the memory array 22. However, since the even field lines are to be processed and stored first, it is necessary to continue the clocking signals to load the shift registers 24, 26 and 28 with the first row of electronic information signals from the even field while discarding the electronic information signals from the odd field already loaded into the shift registers 24, 26 and 28 by way of the diode drain 36.

Figure 3D:
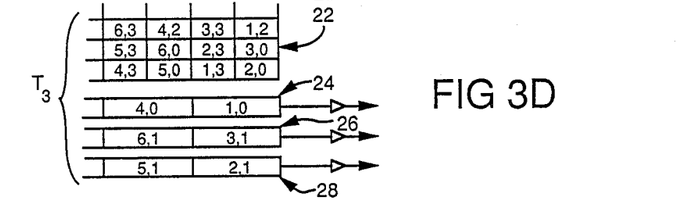

Toward that end, the odd field clock pulse train MB is turned off and the even field clock pulse train MA is turned on to continue the advancement of the electronic information signals from the first row of the even field. Thus, at time $T_3$ it can be seen from FIG. 3D that the even field electronic information signals from the first line of the memory array 22 as shown at 1,0 and 4,0 are transferred to the shift register 24 while each of the electronic information signals previously input to the shift registers 24, 26 and 28 are incrementally advanced downwardly with the electronic information signals 1,1 and 4,1 previously stored by the shift register 28 being dumped by way of the diode drain 36.

Figure 3E:
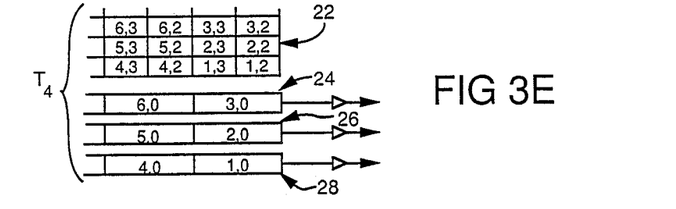

At time $T_4$ it can be seen by referring to FIG. 3E that all the electronic information signals from the first row of the even field are transferred to the registers 24, 26 and 28 with each of the registers holding the electronic information signals from one third of the pixels in the first even field row. After time $T_4$ the transfer gate pulse train is turned off and the shift register pulse trains S3, S2 and S1 are continued at a substantially higher frequency to serially advance the electronic information signals out of the registers 24, 26 and 28 by way of the amplifiers 38, 40 and 42, respectively, to the electronic image processing circuitry previously discussed but not shown.

As is readily apparent, the above described process is repeated during each horizontal line blanking interval to advance electronic information signals for the entire even field of the image. During the next succeeding field the ordered sequencing between the clock pulse trains MA and MB is reversed so that the electronic information signals from all the even field lines are first advanced from the memory array 22 into the registers 24, 26 and 28 and thereafter dumped upon a subsequent advancement of the electronic information signals from the odd field lines. The electronic information signals from all the odd field lines are subsequently transferred out of the shift registers 24, 26, and 28 for signal processing and storage. In this manner even and odd fields are alternately transferred from the memory array 22 by way of three shift registers 24, 26 and 28. It will also be readily understood that by dividing electronic information signals from each line of each field into three groups corresponding to every third column of pixels in the image sensing array 12, there may be provided three distinct color separation signals corresponding to three different colored filters such as red, green and blue overlaying, respectively, every third column of pixels in the image sensing array 12. The operation of the CCD array 10 so far described is conventional and provides for the ready transfer of electronic information signals in a conventional moving video picture mode of operation.

Figure 4A:
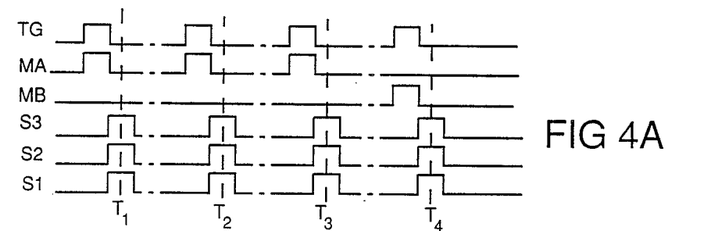
FIG. 4A shows clock pulse trains for controlling the transfer of image data between still other parts of the sensing device of FIG. 1.
Figure 4B:
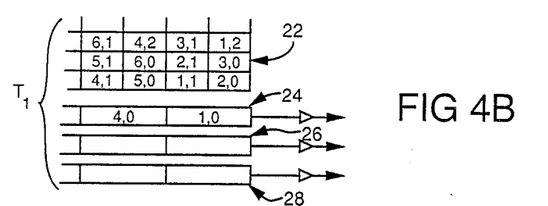
FIGS. 4B through 4E show various stages of data transfer within the sensing device of FIG. 1 at various times as correlated to FIG. 4A; and, FIG. 5 is a diagram pictorally illustrating standard video horizontal and vertical drive signals.

Referring now to FIGS. 4A–4D there is shown the operation of the CCD array 10 in a still picture mode of operation in accordance with the method of this invention. If the camera user decides to switch from the moving picture mode of operation to the still picture mode of operation, a full frame of electronic information signals are detected and subsequently transferred to the memory array 22 in the aforementioned manner. However, once the electronic information signals detected during the still picture mode of operation are transferred to the memory array 22 the subsequent method of transfer of the electronic information signals from the memory array 22 by way of the shift registers 24, 26 and 28 departs from the above-described procedure. The line transfer of electronic information signals from the memory array 22 to the shift register 24 preferably occurs at every fourth horizontal blanking interval in comparison to the line transfer of electronic information signals at every horizontal blanking interval during the previously described moving picture mode of operation. Thus, it can be seen that at time $T_1$ the electronic information signals from one third of the first even field line are transferred to the register 24 as shown in FIG. 4B. All of the shift register transfer clock pulse trains S3, S2 and S1 are provided simultaneously to transfer any extraneous signal noise that might be residing in the registers downwardly and outwardly by way of the diode drain 36.

Figure 4C:
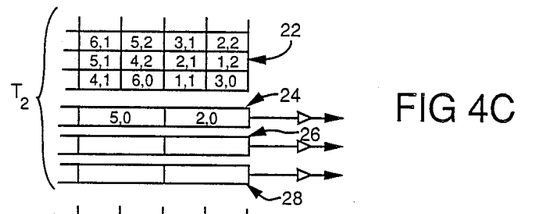
Figure 4D:
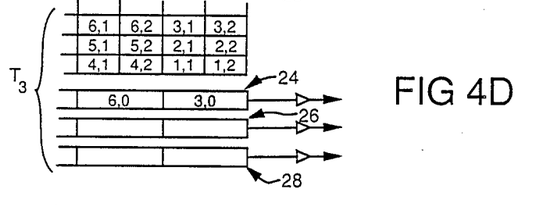
Figure 4E:
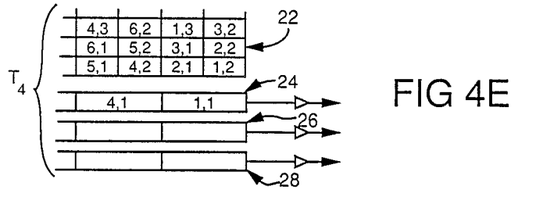

The next transfer of electronic information signals at time $T_2$ occurs during the fourth horizontal blanking interval after the time $T_1$ and operates to transfer the electronic information signals for the second third of the pixels in the first even field line as shown in FIG. 4C. In the intervening time period between time $T_1$ and $_2$ the shift register transfer clock pulse trains S3, S2 and S4 are continuously operated to transfer the electronic information signals as shown at 1,0 and 4,0 horizontally outward by way of the amplifier 38 to the electronic image processing circuitry (not shown).

At time $T_3$ which occurs during the fourth horizontal blanking interval subsequent to the time $T_2$ there is again provided a shift downwardly in the electronic information signals from the memory array 22 to the shift register 24. As previously discussed, the electronic information signals 2,0, 5,0 were previously transferred out of the shift register 24 by way of the amplifier 38 during the intervening time period between time $T_2$ and time $T_3$.

At time $T_4$ as shown in FIG. 4D which again occurs during the fourth horizontal line blanking interval subsequent to the time $T_3$, there is effected another shift downwardly in the electronic information signals from the memory array 22 to the shift register 24. However, it can be seen that prior to the time interval $T_4$ the even field clocking signal MA is turned off and the odd field clocking signal MB is turned on. Thus, electronic information signals as shown at 1,1 and 4,1 are loaded into the shift register 24 and correspond to one third the pixels of the first row of the odd field. As is readily understood, the previously loaded electronic information signals as shown at 3,0, 6,0 were serially transferred out of the shift register 24 by way of the amplifier 38 during the intervening period between time $T_3$ and $T_4$.

Thus, in the time from $T_1$ to $T_4$, the electronic information signals from all the pixels of the first even field line are transferred from the memory 22 by way of the shift register 24. The process is alternately repeated as between the odd and even field lines until all the electronic information signals for the entire still image frame are transferred from the memory 22. As will be readily understood, the way in which still image data is transferred out of the memory 22 by way of the single shift register 24 is substantially slower than the rate at which moving picture video image data is transferred and thus accommodates the recording of high resolution still images by conventional video storage systems such as VHS format video tape. The still image data output from the register 24 as will be readily understood incurs a 3 to 1 decimation and may be further decimated in a manner as disclosed in U.S. patent application Ser. No. 074,773, supra.

Although the invention has been described in conjunction with a charge coupled device (CCD), it will be readily understood that it may be applicable to other types of devices including charge injection devices (CID) and the like. In addition the invention is also applicable to still image electronic image cameras that are not capable of operation in a moving picture mode of operation.

Other embodiments of the invention including additions, subtractions, deletions and other modifications of the preferred disclosed embodiments of the invention will be obvious to those skilled in the art and are within the scope of the following claims.

What is claimed is:

1. In an electronic imaging camera of the type which can be selectively operated in either a moving or still picture mode of operation and including a solid state image sensor comprising: a two-dimensional light sensing array including a plurality of photoresponsive pixel elements arranged in columns and rows, each photoresponsive pixel element responding to incident image defining light to provide a corresponding electronic information signal, a two-dimensional memory including a plurality of electronic information signal storage elements arranged in columns and rows, means for transferring the electronic information signal from the photoresponsive pixel elements to the storage elements in a manner whereby the electronic information signals from the rows of photoresponsive pixel elements are transferred to the columns of storage elements, and register means for transferring the electronic information signals from the memory in a select order whereby at least two electronic information signals from different columns of photoresponsive elements in the light sensing array can be simultaneously transferred during the moving picture mode of operation, the improvement including timing control means for transferring the electronic information signals during said still picture mode of operation from said memory array by way of a single register in a manner whereby the electronic information signals from the pixels of each succeeding row of pixels of the light sensing array are transferred in ordered groupings of pixels in which the pixels of each group are interspersed with the pixels of the remaining groups.

2. The improvement of claim 1 wherein the timing control means for transferring the electronic information signals during said still picture mode from said memory array operates in timed relation with conventional vertical and horizontal video blanking intervals so as to transfer the electronic information signals for each of said groups of pixels at selected intervals corresponding to the horizontal video blanking intervals.

3. The improvement of claim 2 wherein the selected intervals are timed to occur at each of a selected multiple of succeeding horizontal video blanking intervals.

4. In a system for transferring still image defining electronic information signals from a solid state image sensor of the type comprising: a two-dimensional light sensing array including a plurality of photoresponsive pixel elements arranged in columns and rows, each photoresponsive pixel element responding to incident image defining light to provide a corresponding electronic information signal, a two-dimensional memory including a plurality of electronic information signal storage elements arranged in columns and rows, means for transferring the electronic information signals from the photoresponsive pixel elements to the storage elements in a manner whereby the electronic information signals from the rows of photoresponsive pixel elements are transferred to the columns of storage elements, and register means for transferring the electronic information signals from the memory in a select order whereby at least two electronic information signals from different columns of photoresponsive elements in the light sensing array can be simultaneously transferred out of said image sensor, the improvement including:

timing control means for transferring still image defining electronic information signals from said memory array by way of a single register in a manner whereby the electronic information signals from the pixels of each succeeding row of pixels of the light sensing array are transferred in ordered groupings of pixels in which the pixels of each group are interspersed with the pixels of the remaining groups.

5. The improvement of claim 4 wherein the timing control means for transferring the electronic information signals from said memory array operates in timed relation with conventional vertical and horizontal video blanking intervals so as to transfer the electronic information signals for each of said groups of pixels at selected intervals corresponding to the horizontal video blanking intervals.

6. The improvement of claim 5 wherein the selected intervals are timed to occur at each of a selected multiple of succeeding horizontal video blanking intervals.

* * * * *